(12) United States Patent
Sugiyama

(10) Patent No.: US 9,522,602 B2
(45) Date of Patent: Dec. 20, 2016

(54) VEHICLE

(71) Applicant: TOYOTA JIDOSHA KABUSHIKI KAISHA, Toyota-shi, Aichi-ken (JP)

(72) Inventor: Yoshinobu Sugiyama, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/598,483

(22) Filed: Jan. 16, 2015

(65) Prior Publication Data

US 2015/0202972 A1 Jul. 23, 2015

(30) Foreign Application Priority Data

Jan. 21, 2014 (JP) ................... 2014-008481

(51) Int. Cl.
*B60L 11/18* (2006.01)
*B60W 30/18* (2012.01)
*B60W 20/00* (2016.01)
*B60W 50/14* (2012.01)

(52) U.S. Cl.
CPC ........ *B60L 11/1809* (2013.01); *B60L 11/1861* (2013.01); *B60W 20/00* (2013.01); *B60W 20/13* (2016.01); *B60W 20/40* (2013.01); *B60W 30/18054* (2013.01); *B60W 2050/146* (2013.01); *B60W 2510/244* (2013.01); *Y10S 903/903* (2013.01)

(58) Field of Classification Search
CPC .. B60L 11/1809; B60L 11/1861; B60W 20/13; B60W 30/18054; B60W 20/40; B60W 20/00; B60W 2050/146; B60W 2510/244; Y10S 903/903

USPC .......................................... 701/22

See application file for complete search history.

(56) References Cited

U.S. PATENT DOCUMENTS

| 5,285,862 | A | * | 2/1994 | Furutani | ............... | B60K 6/28 |
| | | | | | | 180/65.245 |
| 7,573,151 | B2 | * | 8/2009 | Acena | .............. | B60L 11/005 |
| | | | | | | 307/9.1 |
| 2008/0258895 | A1 | * | 10/2008 | Yamaguchi | ......... | G07C 5/0816 |
| | | | | | | 340/455 |

(Continued)

FOREIGN PATENT DOCUMENTS

| JP | 2006-174619 A | 6/2006 |
| JP | 2008265518 A | 11/2008 |
| JP | 2010-172138 A | 8/2010 |

*Primary Examiner* — Rodney Butler
*Assistant Examiner* — Frederick Brushaber
(74) *Attorney, Agent, or Firm* — Andrews Kurth Kenyon LLP

(57) ABSTRACT

When a vehicle configured to be capable of charging an auxiliary battery with a driving battery's electric power while the vehicle is left unattended has ignition turned off with the main battery having an SOCm smaller than a threshold value, an ECU calculates and indicates to the user a currently permissible unattended period of time in days, and the ECU also inquires of the user whether the user requests to execute engine involved charging control to extend the permissible unattended period of time in days. If the engine involved charging control is requested, the ECU initiates the engine involved charging control, and once the engine involved charging control has been executed for a duration exceeding a commanded period of time, the ECU ceases the engine involved charging control.

4 Claims, 4 Drawing Sheets

(56) References Cited

U.S. PATENT DOCUMENTS

2013/0291515 A1\* 11/2013 Gonze .................... F01N 3/027
                                                                        60/274

\* cited by examiner

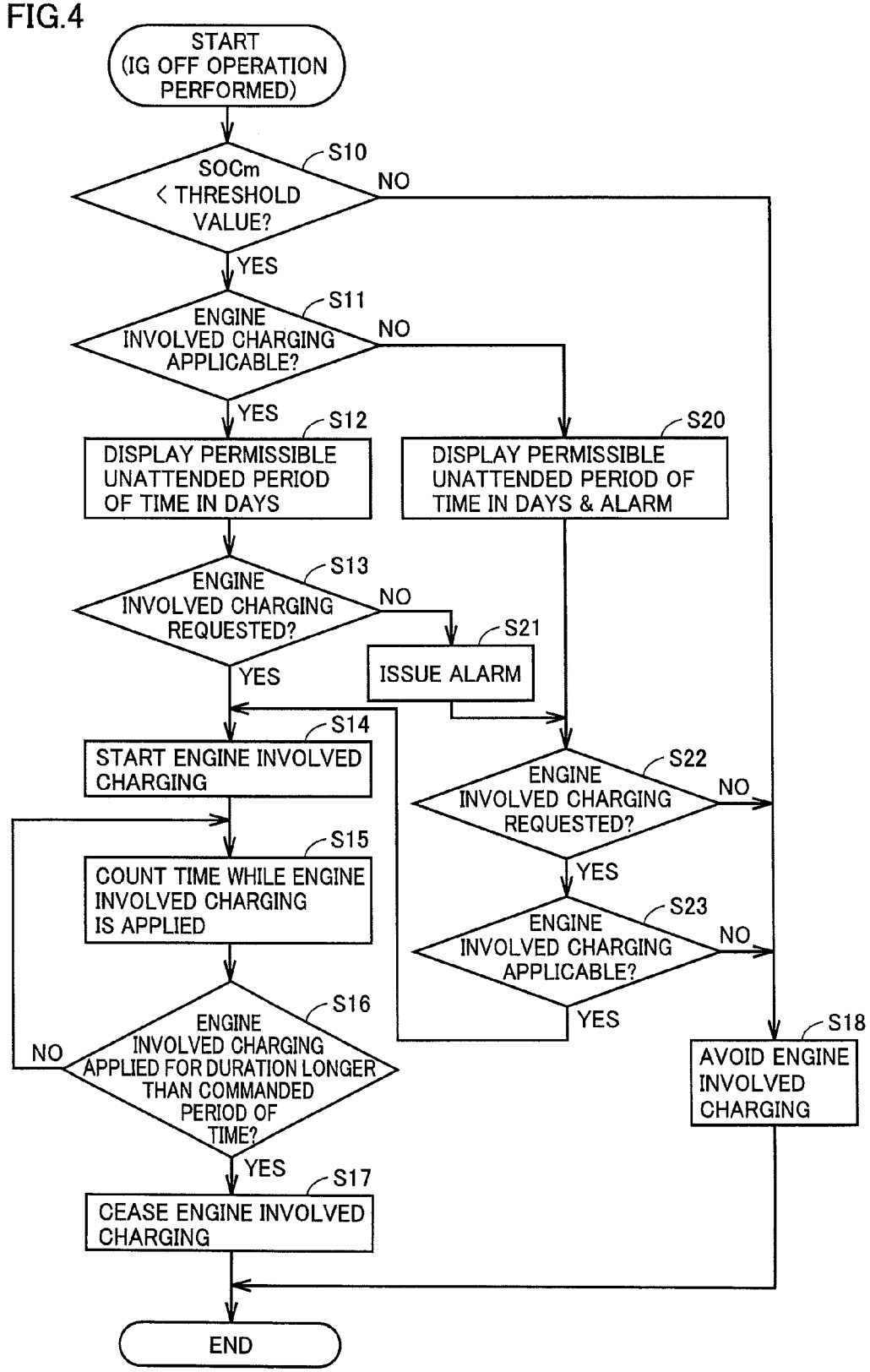

VEHICLE

This nonprovisional application is based on Japanese Patent Application No. 2014-008481 filed on Jan. 21, 2014, with the Japan Patent Office, the entire contents of which are hereby incorporated by reference.

BACKGROUND OF THE INVENTION

Field of the Invention

The present invention relates to a vehicle and particularly to a vehicle that can travel using at least one of a motive power of an engine and an electric power of a driving battery.

Description of the Background Art

Japanese Patent Laying-Open No. 2010-172138 discloses a vehicle including a driving battery and an auxiliary battery and configured to be capable of charging the auxiliary battery with the driving battery's electric power while the vehicle is in a state incapable of travelling (or in a state with an ignition switch turned off). The vehicle calculates from the amount of charge stored in the driving battery a period of time for which the vehicle when left unattended in the state incapable of travelling can nonetheless maintain a state allowing the auxiliary battery to be used to supply an auxiliary load with electric power (hereinafter this period of time will also simply be referred to as a "permissible unattended period of time"), and the vehicle indicates the calculated permissible unattended period of time to the user.

SUMMARY OF THE INVENTION

However, if the vehicle disclosed in Japanese Patent Laying-Open No. 2010-172138 is left unattended (or has its ignition switch turned off) with the driving battery having a small amount of charge stored therein, then subsequently the vehicle left unattended in that condition cannot sufficiently charge the auxiliary battery with the driving battery's electric power, and the vehicle can thus only have a limited permissible unattended period of time to do so.

The vehicle disclosed in Japanese Patent Laying-Open No. 2010-172138 can indicate the permissible unattended period of time to the user. However, the user cannot extend the permissible unattended period of time if it is expected that the vehicle will be left unattended for a period of time longer than the indicated, permissible unattended period of time.

The present invention has been made to address the above issue and contemplates a vehicle configured to be capable of charging an auxiliary battery with a driving battery's electric power while the vehicle is left unattended, that can operate in response to the user's request to extend the permissible unattended period of time.

(1) The present vehicle can travel using at least one of a motive power of an engine and an electric power of a driving battery and includes: an auxiliary battery to store electric power for operating an auxiliary load of the vehicle; and a control device operable to execute a first charging control, when the vehicle is in a state incapable of traveling, to charge the auxiliary battery with the driving battery's electric power. When the user requests to extend a permissible unattended period of time, the control device executes a second charging control to charge the driving battery with electric power generated using the motive power of the engine. Note that the permissible unattended period of time is a period of time for which the vehicle, when the vehicle is left unattended in the state incapable of traveling, can nonetheless maintain by executing the first charging control a state allowing the auxiliary battery to be used to supply the auxiliary load with electric power.

When the user requests to extend the permissible unattended period of time, the second charging control is executed to charge the driving battery with electric power generated using the engine's motive power. This allows the driving battery to store an increased amount of charge therein and the vehicle that is left unattended to execute the first charging control to increase electric energy that can be supplied from the driving battery to the auxiliary battery. The permissible unattended period of time can thus be extended in response to the user's request.

(2) Preferably, when the user performs an off operation to switch the vehicle from a state capable of traveling to the state incapable of traveling, the control device issues to the user an inquiry of whether the user requests to extend the permissible unattended period of time, and if the user responds to the inquiry by requesting to extend the permissible unattended period of time, the control device executes the second charging control.

The permissible unattended period of time can thus be extended previously in response to the user's request when the off operation is performed.

(3) Preferably, when the user performs an off operation to switch the vehicle from a state capable of traveling to the state incapable of traveling, the control device calculates the permissible unattended period of time from an amount of charge stored in the driving battery, and the control device informs the user of the permissible unattended period of time as calculated.

The user can thus be informed of the permissible unattended period of time calculated from an amount of charge that is stored in the driving battery when the off operation is performed, and the user can consider it in determining whether the user requests extending the permissible unattended period of time.

(4) Preferably, when the user requests to extend the permissible unattended period of time, and when the user also specifies the permissible unattended period of time to be a specific period of time, the control device determines from the specific period of time an amount of electric power charged to the driving battery by executing the second charging control.

Thus an amount of electric power stored in the driving battery by executing the second charging control is determined from a specific period of time as specified by the user. This can avoid charging the driving battery for an unnecessarily extended period of time, which can in turn avoid unnecessarily driving the engine and hence poor fuel economy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a second flowchart to represent a process done by the ECU.

DESCRIPTION OF THE PREFERRED EMBODIMENTS

The present invention in an embodiment will hereinafter be described with reference to the drawings. In the following description, identical components are identically denoted. Their names and functions are also identical. Accordingly, they will not be described repeatedly in detail.

Throughout the present specification, the term "electric power" may mean that in a narrow sense (i.e., power) and may also mean that in a broad sense (i.e., work) or electric energy, and the term is construed flexibly depending on how it is used.

Figure 1:
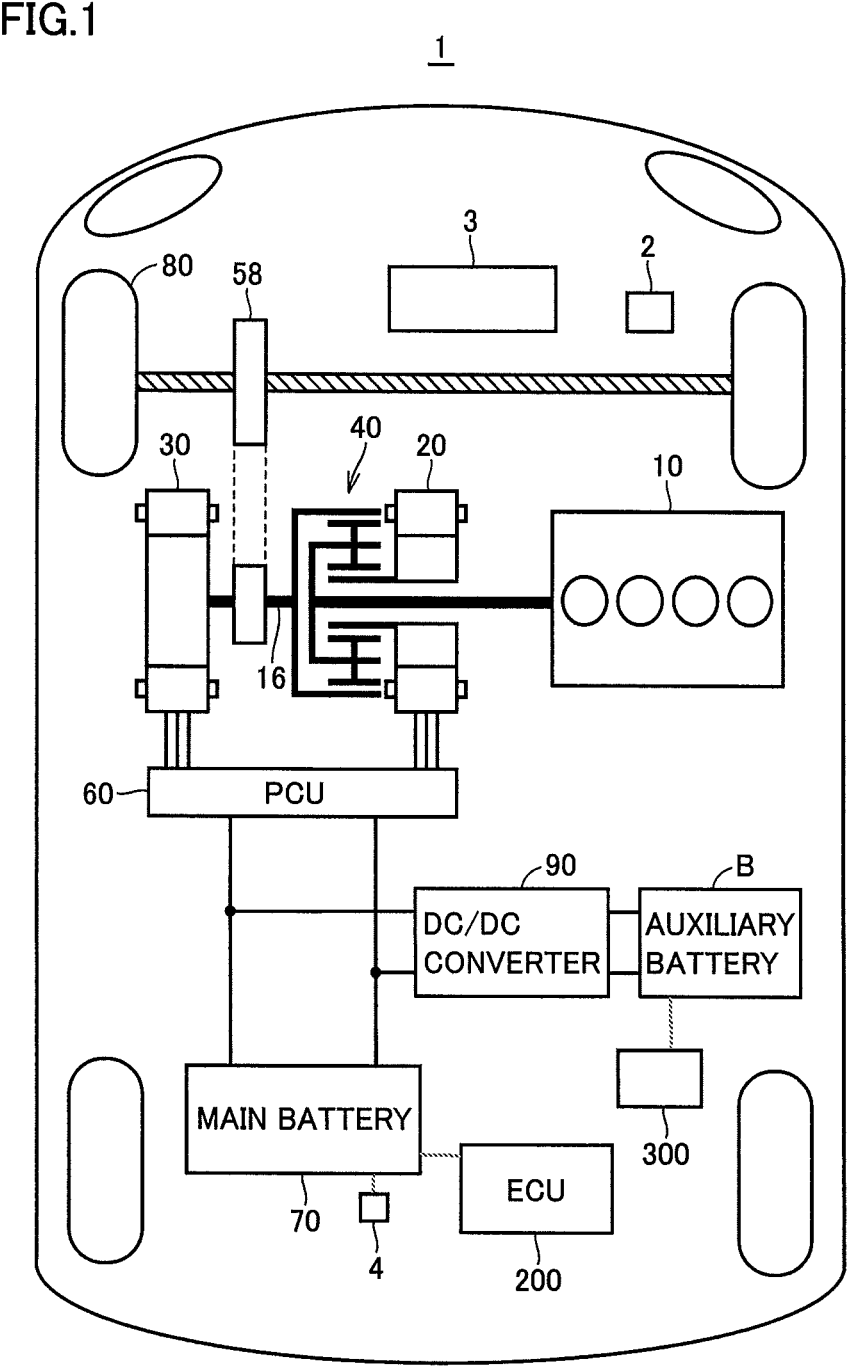
FIG. 1 is a block diagram generally showing a vehicle.

FIG. 1 is a block diagram generally showing a vehicle 1 according to the present embodiment. Vehicle 1 includes an engine 10, a driving shaft 16, a first motor generator (hereinafter referred to as a first MG) 20, a second motor generator (hereinafter referred to as a second MG) 30, a power split device 40, a speed reducer 58, a power control unit (PCU) 60, a battery storing electric power for driving the vehicle (hereinafter also referred to as a main battery) 70, a driving wheel 80, a DC/DC converter 90, a battery storing electric power for an auxiliary load (hereinafter also referred to as an auxiliary battery) B, an electronic control unit (ECU) 200, and a security device 300.

Vehicle 1 is a hybrid vehicle travelling using at least one of the motive power of engine 10 and the motive power of second MG 30 (or the electric power of main battery 70).

Engine 10 generates motive power which is in turn split by power split device 40 for two paths: one is a path for transmission via speed reducer 58 to driving wheel 80, and the other is a path for transmission to first MG 20.

First MG 20 and second MG 30 are, for example, three-phase alternating current (ac) rotating electric machines. First MG 20 and second MG 30 are driven by PCU 60.

First MG 20 has a function as a generator to receive the motive power of engine 10 that is split by power split device 40 to generate electric power.

Second MG 30 has a function as a driving motor to receive at least any one of electric power stored in main battery 70 and electric power generated by first MG 20 to provide driving force to driving wheel 80. In addition, second MG 30 has a function as a generator to receive electric power generated through regenerative braking to generate electric power.

Power split device 40 is a planetary gear mechanism including a sun gear, a pinion gear, a carrier, and a ring gear. The pinion gear engages with the sun gear and the ring gear. The carrier supports the pinion gear rotatably and is coupled with the crankshaft of engine 10. The sun gear is coupled with the rotation shaft of first MG 20. The ring gear is coupled via driving shaft 16 with the rotation shaft of second MG 30 and speed reducer 58.

PCU 60 receives direct current (dc) electric power stored in main battery 70 and converts the dc electric power into ac electric power that can drive first MG 20 and/or second MG 30. Furthermore, PCU 60 receives ac electric power generated by first MG 20 and/or second MG 30 and converts the ac electric power into dc electric power chargeable to main battery 70.

Main battery 70 is a nickel hydride battery, a lithium ion battery or a similar rechargeable battery, for example. Main battery 70 outputs a high voltage for example of approximately 200 V.

Auxiliary battery B stores electric power for operating an auxiliary load mounted in vehicle 1, and supplies the electric power to each auxiliary load, as required. Note that the auxiliary load includes ECU 200, security device 300, a headlight, an audio device and other similar electrical devices in general operating on low voltage (for example of approximately 12 V). Auxiliary battery B outputs a voltage that is matched to the auxiliary load's operating voltage (for example of approximately 12 V, as set forth above), and lower than that output from main battery 70 (e.g., approximately 200 V).

DC/DC converter 90 is provided between auxiliary battery B and main battery 70. DC/DC converter 90 is configured to be capable of receiving voltage from main battery 70, buckboosting the received voltage, and supplying the buckboosted voltage to auxiliary battery B.

Furthermore, vehicle 1 is provided with an ignition (IG) switch 2, a display device 3, and a monitoring sensor 4.

IG switch 2 is a device operated by the user to switch the vehicle between a state capable of traveling (hereinafter also referred to as a "Ready-ON state") and a state incapable of traveling (hereinafter also referred to as a "Ready-OFF state"). When the vehicle is in the Ready-OFF state and the user presses IG switch 2 (hereinafter this operation will also be referred to as an "IG ON operation") an IG relay (not shown) is turned on (or closed) and a vehicular control system including ECU 200 is initiated. ECU 200 that is initiated turns on (or closes) a system main relay (not shown) provided between PCU 60 and main battery 70. This connects main battery 70 to PCU 60 and the vehicle thus establishes the Ready-ON state. In contrast, when the vehicle is in the Ready-ON state and the user presses IG switch 2 (hereinafter this operation will also be referred to as an "IG OFF operation") ECU 200 turns off (or opens) an IG relay (not shown). This disconnects main battery 70 from PCU 60 and the vehicle thus establishes the Ready-OFF state.

Display device 3 is configured for example including a so-called touchscreen panel, and it receives information from ECU 200 and displays the received information to the user, and also receives information input by the user through an operation and transmits the received information to ECU 200.

Monitoring sensor 4 senses a state, such as current, voltage, temperature, of main battery 70, and transmits the sensed result to ECU 200.

Security device 300 is a device that monitors whether there is any dubious person who is going to use vehicle 1 improperly while the registered user of vehicle 1 is absent, and if so, the device informs a vicinity of vehicle 1, a previously registered contact, or the like accordingly. Security device 300 in the Ready-OFF state operates on the electric power supplied from auxiliary battery B. Note that while the present embodiment indicates security device 300 by way of example as an auxiliary load consuming the electric power of auxiliary battery B in the Ready-OFF state, the auxiliary load may not be security device 300 or may be security device 300 and in addition thereto another such auxiliary load.

Furthermore, although not shown, vehicle 1 is provided with a plurality of sensors to sense accelerator pedal position (or an amount by which the user operates the accelerator pedal), engine speed, vehicular speed V, and a variety of other physical quantities required for controlling vehicle 1. These sensors transmit their sensed results to ECU 200.

ECU 200 is an electronic control unit having a central processing unit (CPU) and a memory (not shown) incorporated therein. ECU 200 performs a prescribed operational processing based on information received from each sensor and information stored in the memory and uses the resultant operation to control each device of vehicle 1.

ECU 200 uses a result as sensed by monitoring sensor 4 to calculate a state of charge of main battery 70 (hereinafter referred to as "SOCm"). SOCm represents a proportion (in %) of an amount of charge (Ah) stored in main battery 70 relative to a full charge capacity (Ah) of main battery 70. SOCm is calculatable in a variety of known methods such as using a relationship between main battery 70's voltage and SOC, a cumulative value of a current of main battery 70, or the like.

As has been set forth above, vehicle 1 includes main battery 70 to supply electric power to second MG 30 generating vehicular driving force, and, apart from that, includes auxiliary battery B lower in voltage than main battery 70. Vehicle 1 is adapted to allow auxiliary battery B to supply a low-voltage auxiliary load (e.g., ECU 200, security device 300, and the like) with electric power.

In the Ready-OFF state, a large number of auxiliary loads including ECU 200 cease operating. However, security device 300 and some other auxiliary loads consume the electric power of auxiliary battery B even in the Ready-OFF state. If vehicle 1 is left in the Ready-OFF state unattended for a long period of time, the amount of charge stored in auxiliary battery B is reduced and the auxiliary load may no longer be operable. If in that case the user performs the IG ON operation to start vehicle 1, the user cannot switch the vehicle to the Ready-ON state and hence cannot start vehicle 1.

Accordingly, ECU 200 is configured to be automatically initiated in the Ready-OFF state periodically as prescribed (e.g., for every 10 days). When ECU 200 is automatically initiated in the Ready-OFF state, and auxiliary battery B has stored therein an amount of charge smaller than a prescribed value, ECU 200 executes a control to use the electric power of main battery 70 to charge auxiliary battery B (hereinafter also referred to as "the pumped charging control"). The pumped charging control allows vehicle 1 left unattended for a long period of time to nonetheless maintain the state allowing auxiliary battery B to be used to supply the auxiliary load with electric power.

When ECU 200 executes the pumped charging control, ECU 200 establishes a path for supplying electric power from main battery 70 to auxiliary battery B, and ECU 200 also controls DC/DC converter 90 to buckboost the voltage of main battery 70 and supply the buckboosted voltage to auxiliary battery B. Note, however, that when main battery 70 has an SOCm smaller than a reference value, ECU 200 does not execute the pumped charging control. In other words, when main battery 70 has a small amount of charge stored therein, the pumped charging control is prohibited.

Note that vehicle 1 left in the Ready-OFF state unattended can maintain by executing the pumped charging control for a period of time a state allowing auxiliary battery B to be used to supply the auxiliary load with electric power, and this period of time will hereinafter also be referred to as a "permissible unattended period of time." Accordingly, the permissible unattended period of time is longer when main battery 70 has a larger SOCm (i.e., when main battery 70 pumped as controlled can supply and thus charge auxiliary battery B with larger electric energy).

When vehicle 1 thus configured has the IG switch turned off with main battery 70 having a small SOCm and the vehicle is left in that condition unattended, the pumped charging control may be executed insufficiently and as a result the vehicle may only have a limited permissible unattended period of time.

Accordingly in the present embodiment when the IG OFF operation is performed ECU 200 inquires of the user whether the user requests to extend the permissible unattended period of time. If the user responds to the inquiry by requesting to do so, ECU 200 executes a control to charge main battery 70 with the electric power generated by first MG 20 using the motive power of engine 10 (hereinafter also referred to as "the engine involved charging control").

Figure 2:
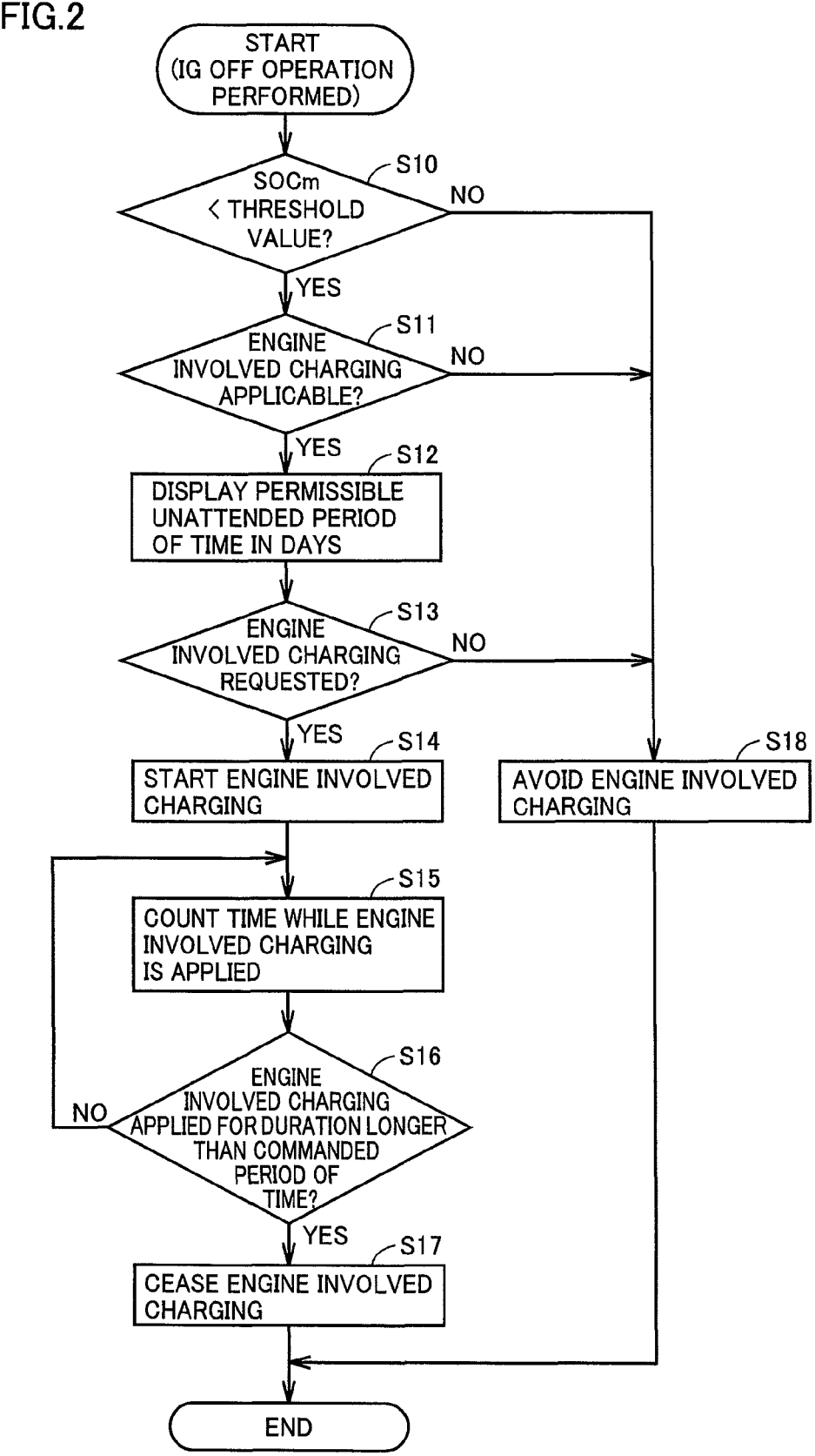
FIG. 2 is a first flowchart to represent a process done by an ECU.

FIG. 2 is a first flowchart to represent a process done by ECU 200 when the IG OFF operation is performed. Note that while hereinafter the permissible unattended period of time will be represented in days, it is by way of example and may be represented in hours, minutes or the like.

In step (S) 10, ECU 200 determines whether the current SOCm (i.e., an SOCm that main battery 70 has when the IG OFF operation is performed) is smaller than a threshold value. Note that the threshold value is determined based on the above described reference value (i.e., a value for which the vehicle left unattended is prohibited from executing the pumped charging control). For example, the reference value may per se serve as the threshold value.

When the current SOCm is smaller than the threshold value (YES in S10), ECU 200 proceeds to S11 to determine whether the engine involved charging control is executable. For example, ECU 200 determines that the engine involved charging control is executable when the following conditions (c1) and (c2):

(c1) the vehicle currently has a shift position at a parking (P) position; and (c2) the vehicle currently has a parking brake in an ON state are both established, otherwise ECU 200 determines that the engine involved charging control is not executable.

Conditions (c1) and (c2) are both conditions for ensuring that vehicle 1 does not start to move when the engine involved charging control is executed and engine 10 is accordingly operated.

Note that conditions (c1) and (c2) are merely illustrative and are not intended to serve as a limitation. For example, conditions (c1) and (c2) and in addition thereto at least any one of conditions (c3) to (c5) may be executed, as follows:

(c3) the vehicle has its engine hood (not shown) closed;

(c4) the vehicle has vehicular speed V of 0 (or vehicle 1 is stopped); and (c5) the vehicle does not have a system fault such as a broken signal line.

When the engine involved charging control is executable (YES in S11), ECU 200 proceeds to S12 to calculate the currently permissible unattended period of time in days from the current SOCm and cause display device 3 to display it together with other information.

For example, ECU 200 uses an expression (e1) to calculate the currently permissible unattended period of time in days, as follows:

$$\text{currently permissible unattended period of time in days} = (\text{main battery's full charge capacity} \times \text{current } SOCm)/\text{dark current} \quad (e1),$$

wherein the main battery's full charge capacity×the current SOCm indicates an amount of charge (Ah) currently stored in main battery 70, and dark current indicates an amount of electricity (Ah/day) that auxiliary battery B outputs to the auxiliary load a day while vehicle 1 is left unattended, and it has a value predetermined through an experiment or the like. Note that expression (e1) is merely illustrative and is not intended to serve as a limitation. For example, how much amount of charge is currently stored in auxiliary battery B may also be considered to calculate the currently permissible unattended period of time in days.

ECU 200 in S12 causes display device 3 to display the calculated currently permissible unattended period of time in days together with a message to inquire of the user whether the user requests to execute the engine involved charging control to extend the permissible unattended period of time in days.

Figure 3:
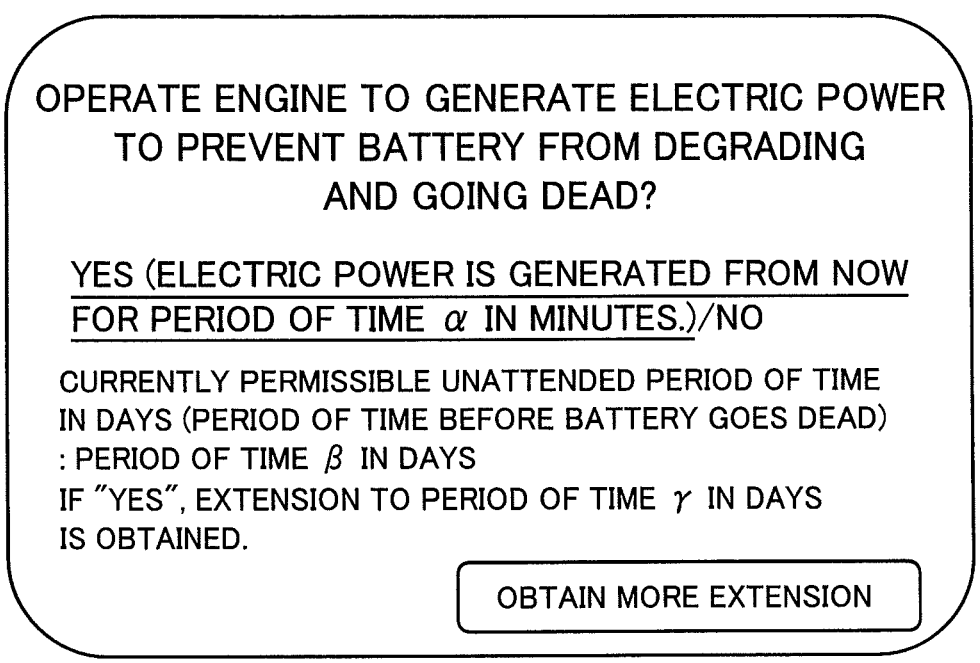
FIG. 3 shows by way of example an indication that the ECU causes a display device to display.

FIG. 3 shows by way of example an indication that ECU 200 in S12 causes display device 3 to display.

As shown in FIG. 3, display device 3 has a screen, which displays a message "Operate engine to generate electric power to prevent battery from degrading and going dead?" This message is displayed to inquire of the user whether the user requests to execute the engine involved charging control to extend the permissible unattended period of time in days.

Furthermore, display device 3 displays on the screen a YES button pressed to select generating electric power from now for a period of time α in minutes, and a NO button. The user can touch on the screen at the YES button to enter that the user requests the engine involved charging control. The user can touch on the screen at the NO button to enter that the user does not request the engine involved charging control. The period of time α in minutes is a commanded period of time to execute the engine involved charging control. This commanded period of time to execute the engine involved charging control can be adjusted to modify an amount of electric power generated by executing the engine involved charging control (i.e., an amount of electric power charged to main battery 70).

ECU 200 uses an expression (e2) to calculate a commanded period of time to execute the engine involved charging control (in hours), as follows:

commanded period of time=dark electric energy×(commanded permissible unattended period of time in days minus currently permissible unattended period of time in days)/electric power charged        (e2), wherein: dark electric energy is electric energy (Wh/day) consumed by the auxiliary load a day while vehicle 1 is left unattended, and it has a value predetermined through an experiment or the like; the commanded permissible unattended period of time in days is set to a predetermined standard period of time in days (e.g., 75 days), unless otherwise specified by the user, otherwise it is set to a period of time in days as specified by the user; the currently permissible unattended period of time in days has a value calculated via expression (e1); and the electric power charged is electric power (W) chargeable to main battery 70 by executing the engine involved charging control, and it has a value determined by the state of main battery 70, the performance of DC/DC converter 90, and the like. Note that expression (e2) is merely illustrative and does not serve as a limitation.

Furthermore, display device 3 displays on the screen a resultant calculation of the currently permissible unattended period of time as a period of time β in days allowed before the battery goes dead. The user can thus be informed of the currently permissible unattended period of time β in days, and the user can consider it in determining whether the user requests to execute the engine involved charging control to extend the permissible unattended period of time in days.

Furthermore, display device 3 indicates on the screen "If YES, an extension to a period of time γ in days is obtained." Note that the period of time γ in days represents the above described, commanded permissible unattended period of time in days, and it indicates a permissible unattended period of time as extended by executing the engine involved charging control. The user can thus be previously informed of the extended permissible unattended period of time in days.

Furthermore, display device 3 displays on the screen an extension button pressed to extend the permissible unattended period of time in days. When the user touches the extension button, a subscreen (not shown) is further displayed to allow the user to specify a commanded permissible unattended period of time in days (i.e., an extended permissible unattended period of time in days). When the user specifies (or inputs) a commanded permissible unattended period of time in days via the subscreen, ECU 200 changes the period of time γ in days on the screen from a standard period of time in days to the commanded permissible unattended period of time in days as specified by the user, and ECU 200 also executes the commanded permissible unattended period of time in days as specified by the user to expression (e2) to again calculate a commanded period of time for executing the engine involved charging control and accordingly modify the period of time α in minutes indicated on the screen.

Note that what is indicated by display device 3 may entirely or partially be indicated to the user audibly.

Again with reference to FIG. 2, ECU 200 proceeds to S13 to determine whether the user requests the engine involved charging control. As has been set forth above, when the user touches the "YES" on the screen of display device 3, ECU 200 determines that the user requests the engine involved charging control. When the user touches the "NO" on the screen of display device 3, ECU 200 determines that the user does not request the engine involved charging control.

Once the engine involved charging control has been requested (YES in S13), ECU 200 proceeds to S14 to initiate the engine involved charging control.

ECU 200 proceeds to S15 to count (or measure) time while the engine involved charging control is executed.

ECU 200 proceeds to S16 to determine whether the engine involved charging control has been executed for a duration exceeding the commanded period of time applied to execute the engine involved charging control (see expression (e2) above).

If not (NO in S16), ECU 200 returns to S15 and continues the engine involved charging control.

If so (YES in S16), ECU 200 proceeds to S17 to cease the engine involved charging control. Subsequently, the vehicle's status is switched to the Ready-OFF state.

In contrast, if the current SOCm is not smaller than the threshold value (NO in S10), the engine involved charging control is not executable (NO in S11), or the user does not request the engine involved charging control (NO in S13), then ECU 200 avoids the engine involved charging control (S18). Subsequently, the vehicle's status is switched to the Ready-OFF state.

Thus in the present embodiment ECU 200 executes the engine involved charging control to charge main battery 70 when the user requests to extend a permissible unattended period of time. Main battery 70 can thus have an increased amount of charge stored therein and vehicle 1 left unattended can accordingly increase electric energy supplied from main battery 70 to auxiliary battery B by executing pumped charging. The permissible unattended period of time can thus be extended in response to the user's request.

In particular, in the present embodiment, ECU 200 operates in response to the IG OFF operation to display a message to inquire of the user whether the user requests to extend the permissible unattended period of time, and if the user responds to the inquiry by requesting to do so, ECU 200 executes the engine involved charging control. The permissible unattended period of time can thus be extended previously in response to the user's request when the IG OFF operation is performed.

Furthermore in the present embodiment ECU 200 calculates the permissible unattended period of time from an amount of charge that is stored in main battery 70 when the IG OFF operation is performed, and ECU 200 indicates the calculated permissible unattended period of time to the user. The user can thus be informed of the permissible unattended period of time calculated from the amount of charge that is stored in main battery 70 when the IG OFF operation is performed, and the user can consider it in determining whether the user requests to extend the permissible unattended period of time.

Furthermore in the present embodiment if the user requests to extend the permissible unattended period of time, and, in doing so, the user also specifies a specific period of time to do so, then ECU 200 determines from the specific period of time a commanded period of time applied to execute the engine involved charging control (i.e., an amount of electric power charged to main battery 70 by executing the engine involved charging control). This can avoid charging main battery 70 for an unnecessarily extended period of time, which can in turn avoid unnecessarily driving engine 10 and hence poor fuel economy.

Exemplary Variation

FIG. 4 is a flowchart to represent a process done by ECU 200 when the IG OFF operation is performed, as provided in an exemplary variation. Note that the FIG. 4 steps that have step numbers, respectively, identical to those of the FIG. 2 steps are as has been described with reference to FIG. 2 and accordingly, will not be described repeatedly.

When the current SOCm is smaller than the threshold value and the engine involved charging control is not executable (YES in S10 and NO in S11), ECU 200 proceeds to S20 to cause display device 3 to display the currently permissible unattended period of time in days, and together therewith, that there is a possibility that the permissible unattended period of time in days may be short. For example, when the parking brake is not in the ON state and accordingly, condition (c2) is not established, ECU 200 may cause display device 3 to indicate "As the parking brake is not in the ON state, the engine involved charging control is not executable. Set the parking brake to the ON state." to issue an alarm. Furthermore, for example, if the engine hood is open and accordingly, condition (c3) is not established, ECU 200 may cause display device 3 to indicate "As the engine hood is open, the engine involved charging control is not executable. Close the engine hood." to issue an alarm.

If the current SOCm is smaller than the threshold value and the engine involved charging control is executable, and the user does not request the engine involved charging control (YES in S10, YES in S11, and NO in S13), then ECU 200 proceeds to S21 to cause display device 3 to indicate "Is it really OK without extending the permissible unattended period of time in days?" to issue an alarm.

After the S20 or S21 alarm is issued, ECU 200 proceeds to S22 to determine whether the user has requested the engine involved charging control.

If so (YES in S22), ECU 200 proceeds to S23 to again determine whether the engine involved charging control is executable.

If so (YES in S23), ECU 200 proceeds to S14 to initiate the engine involved charging control.

After the alarm is issued if the user does not request the engine involved charging control (NO in S22) or the engine involved charging control is not executable (NO in S23) then ECU 200 proceeds to S18 to avoid the engine involved charging control.

Thus an alarm can be issued to urge the user to be alert when there is a possibility that there may only be a limited permissible unattended period of time in days and despite that the permissible unattended period of time in days is not extended (i.e., when the engine involved charging control is not executable or the user does not request the engine involved charging control). The alarm can urge the user to enable the engine involved charging control, request the engine involved charging control, or the like to extend the permissible unattended period of time in days.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle that can travel using at least one of a motive power of an engine and an electric power of a driving battery, comprising:
an auxiliary battery to store electric power for operating an auxiliary load of the vehicle; and
an electronic control unit including a central processing unit and memory for performing operational processing to control the vehicle, the electronic control unit configured to:
execute a first charging control, when the vehicle is in a state incapable of traveling, to charge said auxiliary battery with said driving battery's electric power,
execute a second charging control to charge said driving battery with electric power generated using the motive power of said engine, when a user requests to extend a permissible unattended period of time, wherein
said permissible unattended period of time being a period of time for which the vehicle, when the vehicle is left unattended in said state incapable of traveling, is configured to maintain, by executing said first charging control, a state allowing said auxiliary battery to be used to supply said auxiliary load with electric power.

2. The vehicle according to claim 1, wherein when the user performs an off operation to switch the vehicle from a state capable of traveling to said state incapable of traveling, said control device issues to the user an inquiry of whether the user requests to extend said permissible unattended period of time, and if the user responds to said inquiry by requesting to extend said permissible unattended period of time, said control device executes said second charging control.

3. The vehicle according to claim 1, wherein when the user performs an off operation to switch the vehicle from a state capable of traveling to said state incapable of traveling, said control device calculates said permissible unattended period of time from an amount of charge stored in said driving battery, and said control device informs the user of said permissible unattended period of time as calculated.

4. The vehicle according to claim 1, wherein when the user requests to extend said permissible unattended period of time, and when the user also specifies said permissible unattended period of time to be a specific period of time, said control device determines from said specific period of time an amount of electric power charged to said driving battery by executing said second charging control.

* * * * *